(12) United States Patent
Taguchi et al.

(10) Patent No.: US 6,785,415 B1
(45) Date of Patent: Aug. 31, 2004

(54) IMAGE PROCESSING METHOD, AN IMAGE PROCESSING APPARATUS, AND A RECORDING MEDIA ON WHICH AN IMAGE PROCESSING PROGRAM IS RECORDED

(75) Inventors: Jun'ichi Taguchi, Sagamihara (JP); Kunihiko Kido, Kawasaki (JP)

(73) Assignee: Hitachi Medical Corporation, Tokyo (JP)

( * ) Notice: Subject to any disclaimer, the term of this patent is extended or adjusted under 35 U.S.C. 154(b) by 0 days.

(21) Appl. No.: 09/402,587
(22) PCT Filed: Apr. 6, 1998
(86) PCT No.: PCT/JP98/01578
§ 371 (c)(1), (2), (4) Date: Oct. 7, 1999
(87) PCT Pub. No.: WO98/45810
PCT Pub. Date: Oct. 15, 1998

(30) Foreign Application Priority Data

Apr. 7, 1997 (JP) .............................................. 9-087836

(51) Int. Cl.[7] .............................. G06K 9/40; G06T 5/00
(52) U.S. Cl. ........................ 382/173; 382/199; 382/261; 382/264
(58) Field of Search ................................ 382/173, 199, 382/261, 264

(56) References Cited

U.S. PATENT DOCUMENTS

| | | | |
|---|---|---|---|
| 5,418,899 A | | 5/1995 | Aoki et al. |
| 5,561,724 A | | 10/1996 | Kido et al. |
| 5,768,440 A | * | 6/1998 | Campanelli et al. ........ 382/261 |
| 5,771,318 A | * | 6/1998 | Fang et al. ................. 382/261 |
| 5,818,964 A | * | 10/1998 | Itoh .......................... 382/205 |
| 5,883,983 A | * | 3/1999 | Lee et al. ................... 382/268 |

FOREIGN PATENT DOCUMENTS

| | | |
|---|---|---|
| JP | 3075883 | 3/1991 |
| JP | 5328106 | 12/1993 |
| JP | 6348842 | 12/1994 |
| JP | 8161483 | 6/1996 |
| JP | 9062836 | 3/1997 |

OTHER PUBLICATIONS

Jha et al. "Edge Adaptive Filtering: How Much and Which Direction?" Proc. Int. Conf. on Systems, Man and Cybernetics, Nov. 14, 1989, vol. 1, pp. 364–366.*

McWalter. "Edge Adaptive Image Smoothing." Proc. South African Symposium on Communications and Signal Processing, Aug. 30, 1991, pp. 58–62.*

Wang. "On the Gradient Inverse Weighted Filter." IEEE Trans. on Signal Processing, vol. 40, No. 2, Feb. 1992, pp. 482–484.*

Kontropoulos et al. "Adaptive LMS L–Filters for Smoothing Noisy Images." Proc. 12th IARP Int. Conf. on Pattern Recognition, Conf. C: Signal Processing, vol. 3, Oct. 9, 1994, pp. 181–183.*

Czerwinski et al. "Ultrasound Speckle Reduction by Directional Median Filtering." Proc. Int. Conf. on Image Processing, vol. 1, Oct. 23, 1995, pp. 358–361.*

* cited by examiner

Primary Examiner—Jon Chang
(74) Attorney, Agent, or Firm—Antonelli, Terry, Stout & Kraus, LLP

(57) ABSTRACT

In an image processing method and in an image processing apparatus, edge and flat zones of an original image are separately recognized, a first nonlinear flattening process effective for the edge zone is executed to obtain first data, and a second nonlinear flattening process effective for the flat zone is executed to obtain second data. An image is rearranged by using the first and second data for the edge and flat zones, respectively. On a computer-readable recording media, there is stored the image processing method in the form of a program code.

16 Claims, 11 Drawing Sheets

● SAMPLING POINTS ON PIXELS

○ SAMPLING POINTS REQUIRING INTERPOLATION

● SAMPLING POINTS ON PIXELS

○ SAMPLING POINTS REQUIRING INTERPOLATION

● SAMPLING POINTS ON PIXELS

IMAGE PROCESSING METHOD, AN IMAGE PROCESSING APPARATUS, AND A RECORDING MEDIA ON WHICH AN IMAGE PROCESSING PROGRAM IS RECORDED

TECHNICAL FIELD

The present invention relates to an image processing method, an image processing apparatus, and a recording media on which an image processing program is recorded, and in particular, to an image processing method, an image processing apparatus, and a recording media on which an image processing program is recorded in which an edge zone and a flat zone of an original image are both optimally processed in accordance with respective features thereof to generate an output image having picture quality improved as compared with picture quality of the original image.

BACKGROUND ART

JP-A-8-161483 describes an image processing method in which luminance change values are calculated in a plurality of predetermined directions centered on a given point of an input image, a direction of a minimum value of the luminance change values, i.e., a minimum change direction is selected, and a one-dimensional flattening process is conducted in accordance with data of a plurality of points in the minimum change direction.

Several filtering methods of removing noise of an image have been described in "Directional Image Filter Separating Edge and Flat Zones" written by Taguchi et al in pages 2345 to 2350 of "IEICE Technical Report", Vol. J80-D-II, No. 9 published in September 1997.

An image includes an edge zone including a contour line and a boundary area between bright and dark regions of the image and a flat zone other than the edge zone. Image data varies in features or characteristics between the edge and flat zones. Consequently, when the same one-dimensional nonlinear flattening process is achieved for the image data of the edge and flat zones, it is impossible in some cases to obtain desired picture quality for one or both of the edge and flat zones. That is, a one-dimensional nonlinear flattening process optimal to the edge zone is not necessarily optimal to the flat zone and vice versa depending on cases.

It is therefore an object of the present invention to provide an image processing method, an image processing apparatus, and a recording media on which an image processing program is recorded in which the flattening process is appropriately achieved for both of the edge and flat zones in accordance with the respective features thereof to thereby generate an output image with improved picture quality.

DISCLOSURE OF THE INVENTION

In accordance with the present invention, there is provided an image processing method in which an original image is recognized by separating an edge zone and a flat zone from the image. A first one-dimensional nonlinear flattening process effective for the edge zone of the image is conducted for the image to obtain first data. A second one-dimensional nonlinear flattening process effective for the flat zone of the image is conducted for the image to obtain second data. Using the first and second data respectively for the edge and flat zones, an output image is reconfigured.

In accordance with the present invention, there is provided an image processing apparatus including a unit to execute the image processing method above.

In accordance with the present invention, there is provided a computer-readable recording media on which the image processing method is stored in the form of a program code.

BEST MODE FOR CARRYING OUT THE INVENTION

Next, referring to the accompanying drawings, description will be given of embodiments of the present invention. These embodiments can be implemented by making a computer to read a recording media on which an image processing program is recorded and by functioning the computer as an image processing apparatus.

First Embodiment (1-0) Apparatus Configuration

Figure 11:
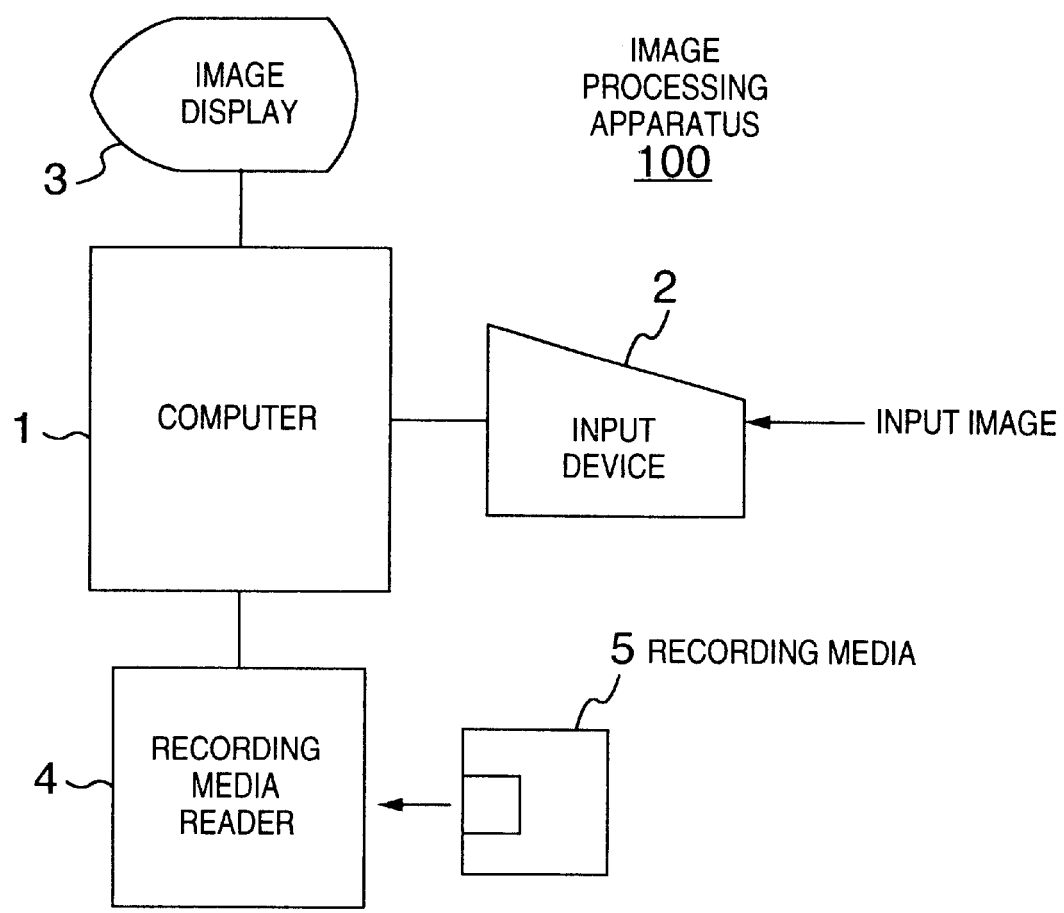
FIG. 11 is a block diagram showing an example of an image processing system in which an image processing method is achieved in accordance with the present invention.

As shown in FIG. 11, an image processing apparatus 100 includes an input device 2 from which an operator inputs, for example, a command; an image display 3, a storage media reader 4, and a recording media 5 on which an image processing program is recorded.

Input device 2 may includes a keyboard and a mouse. Moreover, input device 2 includes an image reader to input an original image to be processed. The image reader acquires luminance data of pixels of the image in the form of digital data. The image reader may include a reading device to read image data from a magnetic optical (MO) disk and/or a digital video disk (DVD). The image reader can receive image data from an external image source via a transmission path, not shown, to transfer the image data to input device 2. Data may include color data and data other than luminance data.

Figure 6:
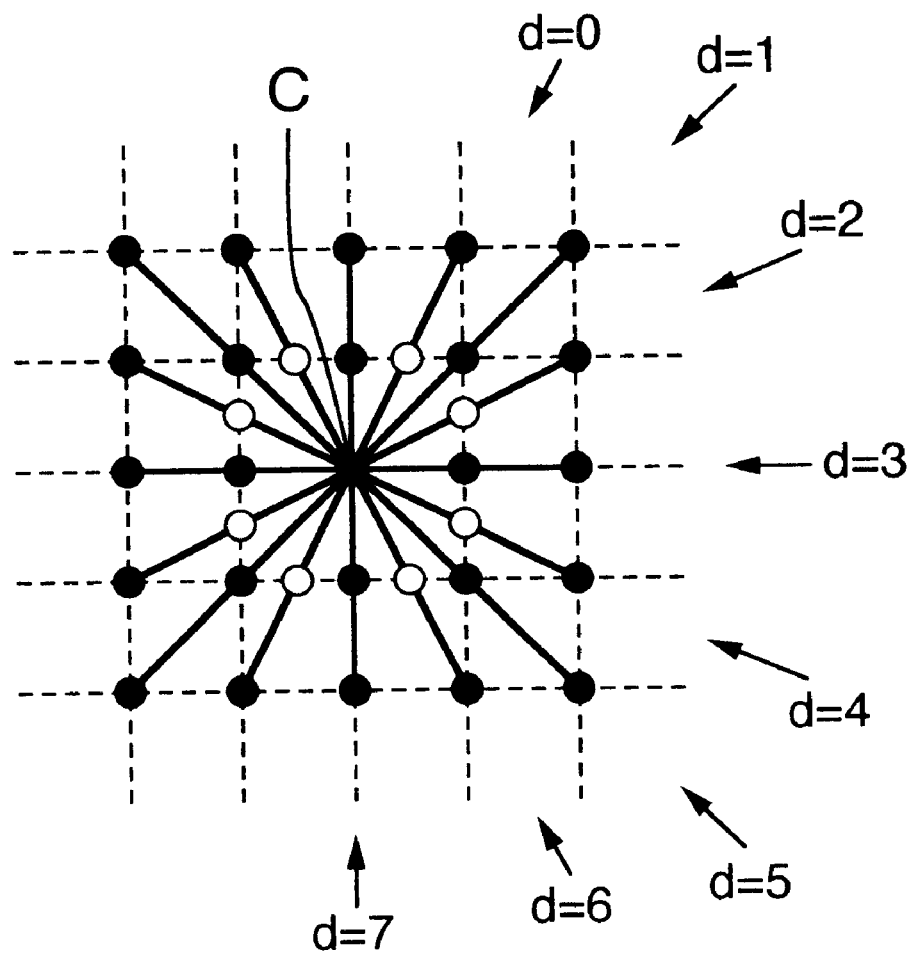
FIG. 6 is a diagram illustratively showing directions and sampling points for the calculation of luminance change values.

The original image from input device 2 is then entirely covered with a mesh like a lattice, for example, as shown in FIG. 6. Intersections or cross-points of the lattice indicate sampling points of luminance data. A first given point C is selected from the sampling points. A data flattening process is then executed for data on one selected point, i.e. given point C. Given point C is sequentially shifted to the subsequent sampling points so that the flattening process is similarly carried out for all sampling points. Results of the flattening process are then rearranged to produce an output image.

In accordance with the present invention, two different kinds of one-dimensional nonlinear flattening processes are executed. The input image is recognized by separating the edge and flat zones from each other. The flattening processes of the different types are respectively conducted for the edge and flat zones to obtain data, which is then arranged into an output image. Next, description will be given in detail of the one-dimensional nonlinear flattening process achieved at each given point in embodiments of the present invention.

(1-1) Outline of Procedure of Image Processing Program

Figure 1:
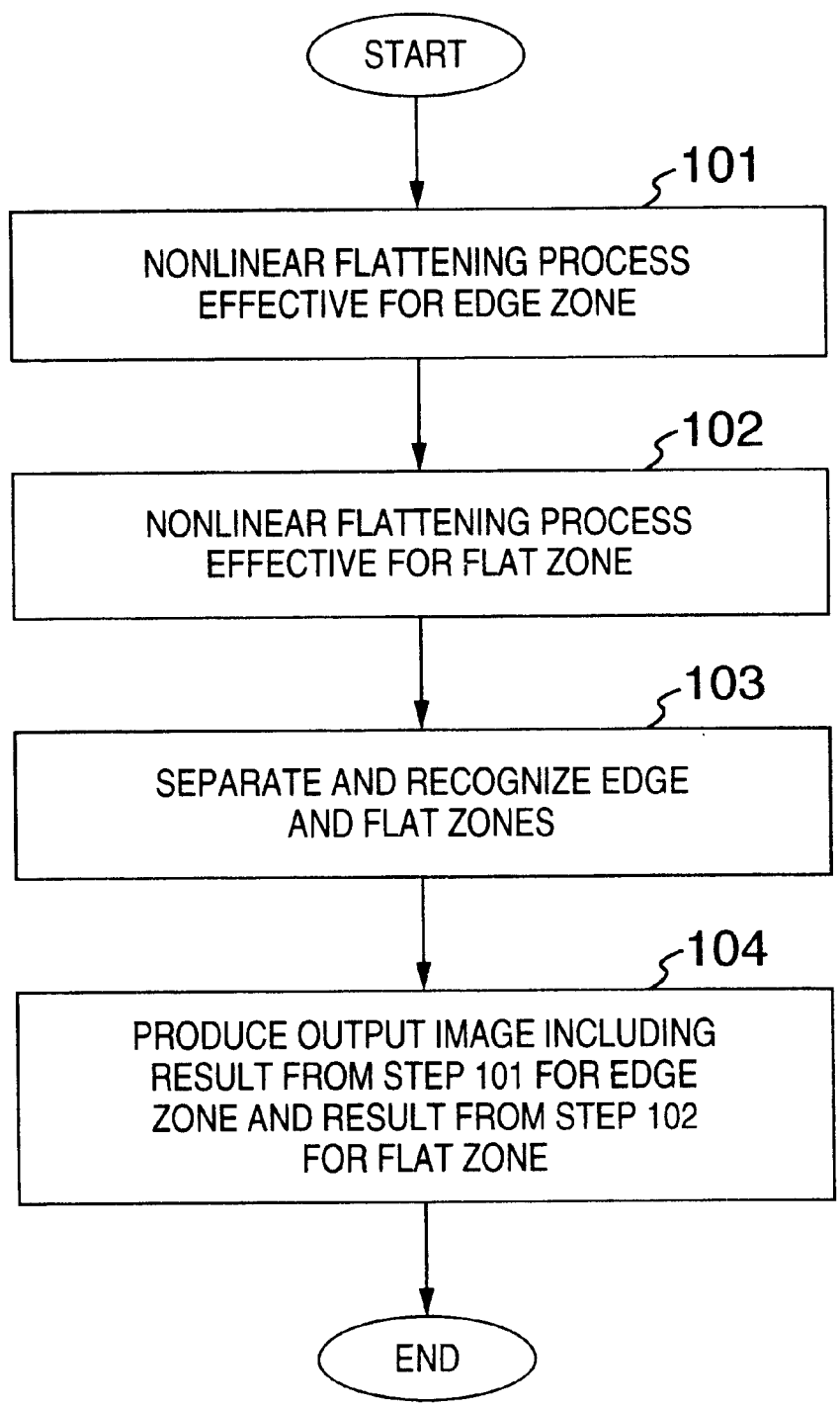
FIG. 1 is a flowchart showing an outline of a processing procedure of a first embodiment of an image processing method in accordance with the present invention.

FIG. 1 is a flowchart showing an outline of a procedure of an image processing program.

Step 101: In accordance with input image values, there is executed a one-dimensional nonlinear flattening process effective only for an edge zone to attain an edge zone flat image A. Data at a point of coordinates (i,j) of image A is expressed as A(i,j).

Step 102: In accordance with an input image, there is executed a flattening process effective only for a flat zone to attain an edge zone flat image B. Data at a point of coordinates (i,j) of image B is expressed as B(i,j).

Step 103: In accordance with, for example, data A(i,j) of edge zone flat image A, an edge zone and a flat zone are separated to be recognized so as to generate a map M to discriminate the edge and flat zones from each other. For example, when a map value of a pair of coordinates (i,j) of map M is expressed as M(i,j), there is assumed that the edge zone has a map value of M(i,j)=1 and the flat zone has a map value of M(i,j)=0.

Step 104: Cut and paste processing is executed, namely, assuming that when output data of a point of coordinates (i,j) of an output image G is expressed as G(i,j), data A(i,j) of flat image A is set as output data G(i,j) if map value M(i,j)=1 and data B(i,j) of flat image B is set as output data G(i,j) if map value M(i,j)=0. That is, the operation is expressed as follows.

If M(i,j)=1(edge zone), G(i,j)=A(i,j)

If M(i,j)=0(flat zone), G(i,j)=B(i,j)  (1)

In this regard, the order of steps 101 and 102 may be exchanged.

Moreover, when step 103 does not refer to the results of steps 101 and 102, the order of step 103 may be exchanged with steps 101 and 102. That is, it is also possible that the processing to separate and recognize the edge and flat zones of the input image is first executed such that output data is determined for a point corresponding to the edge zone by conducting the nonlinear flattening process effective for the edge zone in accordance with data of the input image, and output data is determined for a point corresponding to the flat zone by conducting the flattening process effective for the flat zone in accordance with data of the input image.

(1-2) Processing Procedure of Step 101

Figure 2:
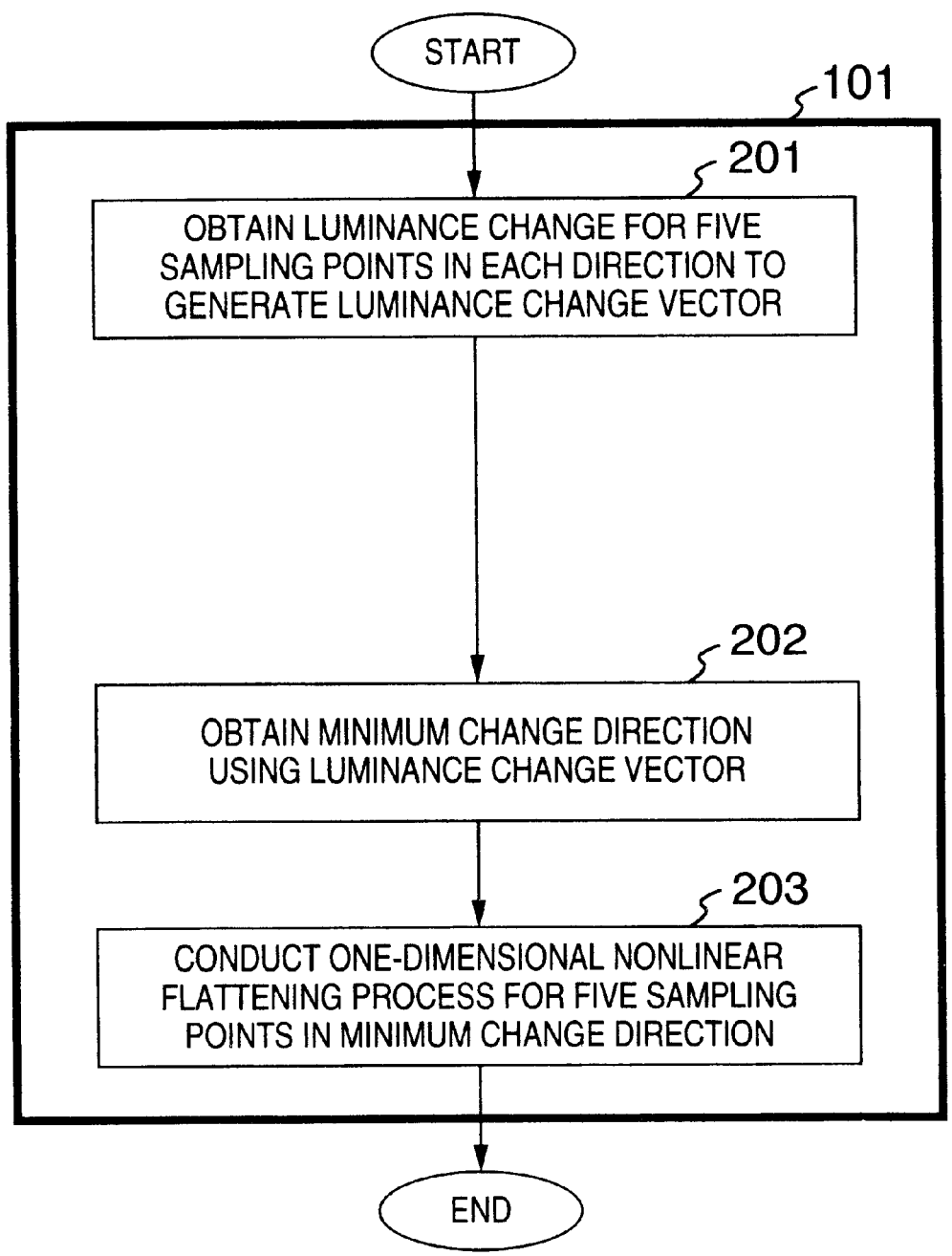
FIG. 2 is a flowchart showing in detail an example of a processing procedure of step 101 of FIG. 1.

FIG. 2 is a flowchart showing in detail an example of the processing procedure of step 101.

Step 201: Luminance change values are calculated in a plurality of predetermined directions centered on a given point of the input image to generate a luminance change vector including the luminance change values as its element. For example, as can be seen from FIG. 6, luminance change values are calculated for five sampling points on direct lines centered on a given point in eight directions of d=0 to 7 to generate a luminance change vector including elements of luminance change values in eight directions. In this connection, solid circles of FIG. 6 indicate sampling points having original data. On the other hand, empty circles are points not having original data, and hence the data of each sampling point is, for example, a mean value of data of two nearest points.

A luminance change value S is calculated, for example, as follows.

$$S(d, i, j) = \sum_{m=-2}^{2} \text{abs}\{dirval\{I(i, j), d, m\} - I(i, j)\} \quad (2)$$

where, S(d,i,j) indicates a luminance change value in direction d at a point of coordinates (i,j), abs{ } means a function for an absolute value, dirval {I(i,j),d,m} indicates data at an m-th sampling point in direction d from a point of coordinates (i,j) of the input image, and I(i,j) denotes data at a point of coordinates (i,j) of the input image.

Figure 7:
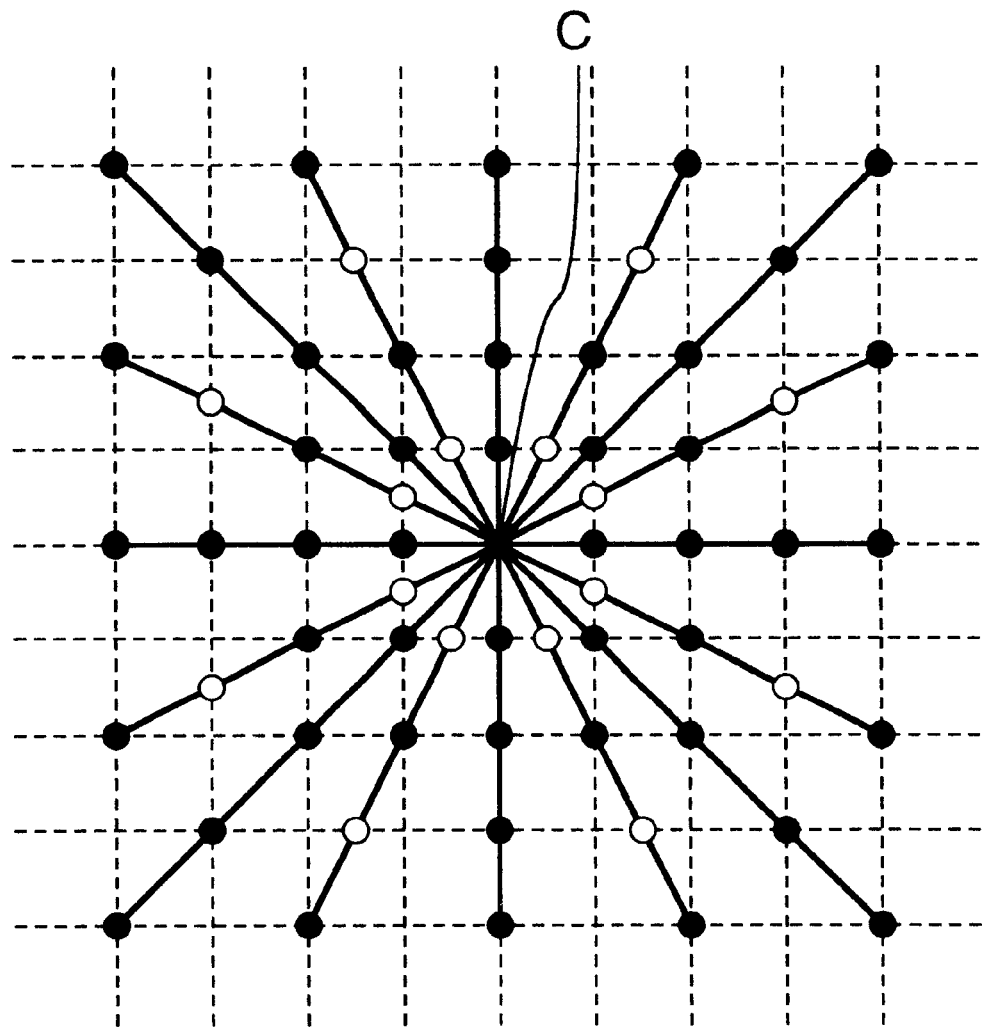
FIG. 7 is another Illustrative diagram showing directions and sampling points for the calculation of luminance change values.
Figure 8:
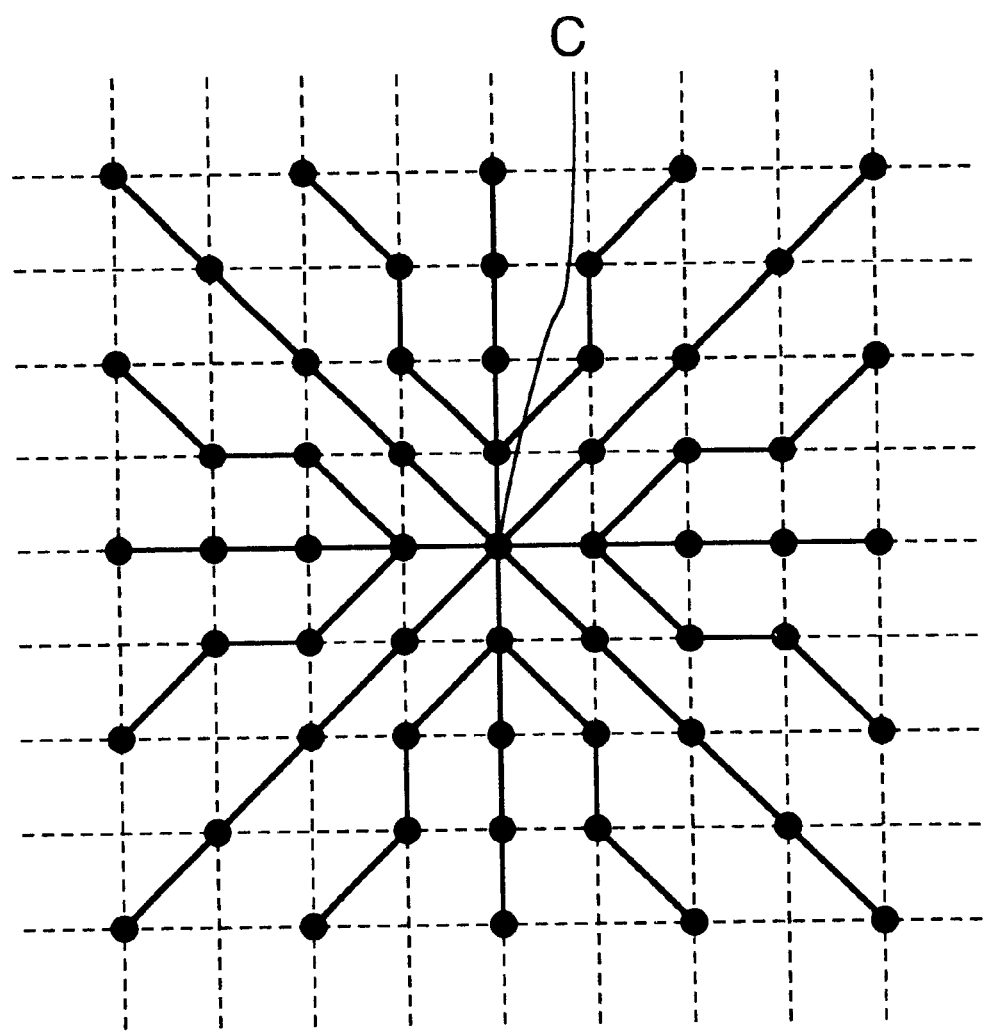
FIG. 8 is a further another Illustrative diagram showing directions and sampling points for the calculation of luminance change values.

Incidentally, sampling points may be selected as shown in FIG. 7, namely, nine sampling points in direct lines in eight directions centered on a given point C. Further more, as shown in FIG. 8, there may be selected points having data in eight directions centered on a given point to determine nine sampling points on each broken line.

Additionally, in an interpolating method to obtain data of a sampling point without original data in accordance with data of peripheral points, there may be directly used data of the nearest point selected from points having data in the periphery of the sampling point.

In addition, in the method of calculating the luminance change values, a function sqr{ } for a square may be adopted in place of abs{ } in expression (2).

Step 202: There is obtained a direction of the minimum value of the elements of the luminance change vector at each point, i.e., the minimum change direction. This is represented by an expression as follows.

$$d\min(i,j) = \text{mindir}\{S(d,i,j)|0<=d<=7\} \quad (3)$$

where, dmin(i,j) indicates a value of minimum change direction d and mindir{S(d,i,j)|0<=d<=7} denotes a value of d for which luminance change value S(d,i,j) is minimum as a result of comparison therebetween for d=1 to 7. In this connection, if two or more directions are obtained for the minimum value, it is only necessary to select an appropriate one therefrom, for example, a minimum value of the values of d.

The direction of the minimum value of elements of luminance change vector is a direction associated with the least luminance change, the direction being parallel to that of the edge zone of the image.

Step 203: The one-dimensional nonlinear flattening process is carried out in minimum change direction dmin(i,j). Expressions (4) to (7) show an example of the one-dimensional nonlinear flattening process.

$$H\min(i,j) = (1-f(i,j))*I(i,j) + f(i,j)*HO(i,j) \quad (4)$$

$$H0(i, j) = \sum_{m=-2}^{2} dirval\{I(i, j), dmin(i, j)m\}/5 \qquad (5)$$

$$f(i,j)=\sigma 0^*\sigma 0/(\sigma 0^*\sigma 0+\alpha^*\alpha^*\sigma(i,j)^*\sigma(i,j)) \qquad (6)$$

$$\sigma(i, j)*\sigma(i, j) = \sum_{m=-2}^{2} (dirval\{I(i, j), dmin(i, j), m\} - H0(i, j)) * \qquad (7)$$

$$(dirval\{I(i, j), dmin(i, j), m\} - H0(i, j))$$

where, Hmin(i,j) indicates output data for a pair of coordinates (i,j) after the flattening. Additionally, dirval{I(i,j),dmin (i,j),m} denotes data at m-th sampling point in minimum change direction dmin(i,j) relative to a point of coordinates (i,j) of the input image. Moreover, H0(i,j) indicates a mean value of data at five sampling points in minimum change direction dmin(i,j) centered on a point of coordinates (i,j) of the input image. Furthermore, σ0 denotes a value proportional to a standard deviation of noise of the input image. In addition, α is a value to determine a degree of flattening, and f(i,j) indicates a coefficient to be assigned to each data.

For σ0, it is only necessary to assume, for example, a small region regarded as noise at an edge of an image such that luminance of each point of the region is squared to obtain an average of resultant values so as to calculate a root of the average. Alternatively, it may also be possible that, for example, about 100 points are assigned in the image to calculate a minimum value of luminance difference between each point and its peripheral point so that the value of σ0 is obtained as an average of resultant values of difference.

In addition to the one-dimensional nonlinear flattening process of expressions (4) to (7), there may be employed the expressions (8) to (11) as follows.

$$Hmin(i, j) = \sum_{m=-2}^{2} w(m, i, j) * dirval\{I(i, j), dmin(i, j), m\} \qquad (8)$$

$$w(m, i, j) = u(m, i, j)/ut(m, i, j) \qquad (9)$$

$$ut(m, i, j) = \sum_{m=-2}^{2} u(m, i, j) \qquad (10)$$

If $m = 0$, $u(0, i, j) = 1$ \qquad (11)
If $m > 1$, $u(m, i, j) =$
 $u(m - 1, i, j)/(1 + dirval\{I(i, j), dmin(i, j), m\}/(\alpha * \sigma 0) ** \beta)$
If $m <= -1$, $u(m, i, j) =$
 $u(m + 1, i, j)/(1 + dirval\{I(i, j), dmin(i, j), m\}/(\alpha * \sigma 0)  \beta)$ where, β is a parameter value to determine contribution of the flattening and ( ) β indicates a β-th power.

As further another one-dimensional nonlinear flattening process, there may be used a method in which, for example, intermediate values are selected from data of a predetermined number of points to deliver the intermediate values as output values. Moreover, when data of the input image include binary values of "0" or "1" and the output image values each are expressed in binary notation using "0" or "1", there may be employed a method to select as the output value the value of data which is larger in number among the data of the predetermined number of points.

Although the number of points is not limited to five for the flattening, three or five points have been found to be favorable in the flattening of the edge zone as a result of evaluation of head and abdomen images obtained by the magnetic resonance imaging (MRI) ordinarily used for the clinical imaging process. Although the 3-point flattening retains fine changes in the edge zone, a small effect of flattening (noise reduction) is observed. Fine changes kept remained by the 5-point flattening are less than those of the 3-point flattening. However, there are kept remained changes of the edge zone necessary to recognize a characteristic of an image to substantially a satisfactory extent. There is observed a high effect of flattening and hence is attained a satisfactory result. According to evaluation of MRI pictures of bones, too much flattening is undesirable and hence the 3-point flattening is more favorable than the 5-point flattening.

The distance between the given point to the farthest sampling point is desirably elongated in the flattening of the flat zone as compared with the flattening of the edge zone for the following reasons. Emphasis is placed on the retaining of fine changes in the flattening of the edge zone, whereas emphasis is placed on a higher effect of flattening in the flattening of the flat zone.

Figure 3:
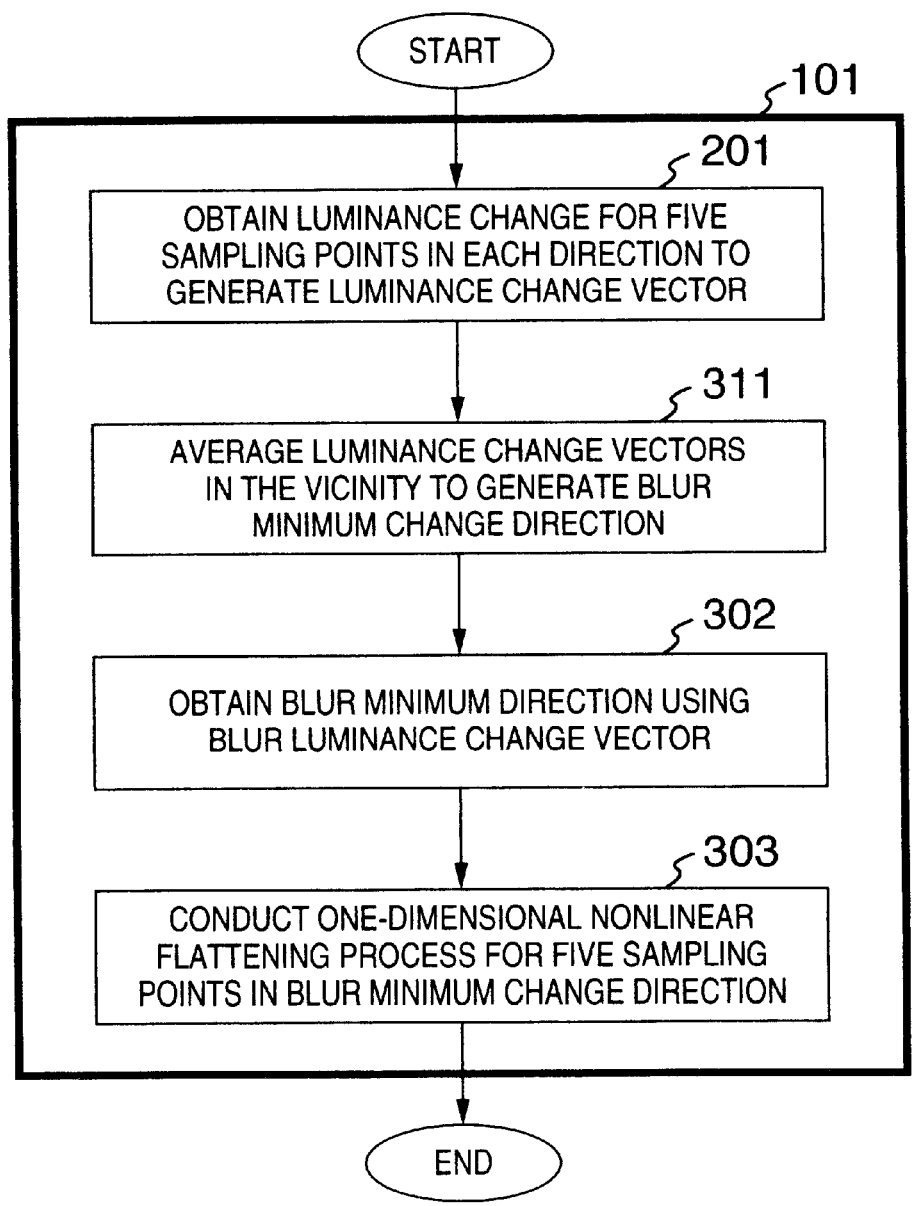
FIG. 3 is a flowchart showing in detail another example of the processing procedure of step 101 of FIG. 1.

FIG. 3 is a flowchart showing in detail another example of the processing procedure of Step 101.

Step 201: Same as step 201 of FIG. 2.

Step 311: By averaging luminance change vectors of the given point and its peripheral points, there is generated blur luminance change vector S'(d,i,j). For example, the following expression is used.

$$S'(d, i, j) = \sum_{p=-1}^{1} \sum_{q=-1}^{1} S(d, i+p, j+q)/9 \qquad (12)$$

Step 302: The direction of the minimum value of elements of vector S'(d,i,j), namely, the blur minimum change direction is obtained. The operation is represented by an expression as follows.

$$dmin'(i,j)=mindir\{S'(d,i,j)|0<=d<=7\} \qquad (13)$$

where, dmin'(i,j) indicates the value of blur minimum value direction d. Additionally, mindir{S'(d,i,j,)|0<=d<=7} means the value of d for which blur luminance change value S'(d,i,j) takes a minimum value as a result of comparison therebetween for d=1 to 7. In this connection, if two or more values are obtained for d, it is only necessary to select an appropriate value therefrom; for example, a minimum value of d need only be assumed.

Step 303: In blur minimum value direction dmin'(i,j), the one-dimensional nonlinear flattening is carried out. For example, dmin(i,j) of expressions (5), (7), (8), and (11) need only be replaced by dmin'(i,j).

Incidentally, since an edge area of the image has no data of neighboring points, particular processing is required to be executed. In the example of particular processing, when the flattening is to be conducted for five points, data of the input image is directly used as output data for an area of two points next to the edge of the image. Moreover, in another example, both edges of the input image are cyclically linked to each other to attain data of neighboring points.

In the processing of FIG. 2, when there is processed an input image in which the S/N ratio is low and its edge is obscure due to noise, the edge zone is expressed with discontinuous lines, which gives us an unnatural impression in some cases. In the processing of FIG. 3, however, even for such an input image, there can be advantageously generated an output image having an edge zone drawing with a smoothly continuous line.

(1-3) Processing Procedure of Step 102

Figure 4:
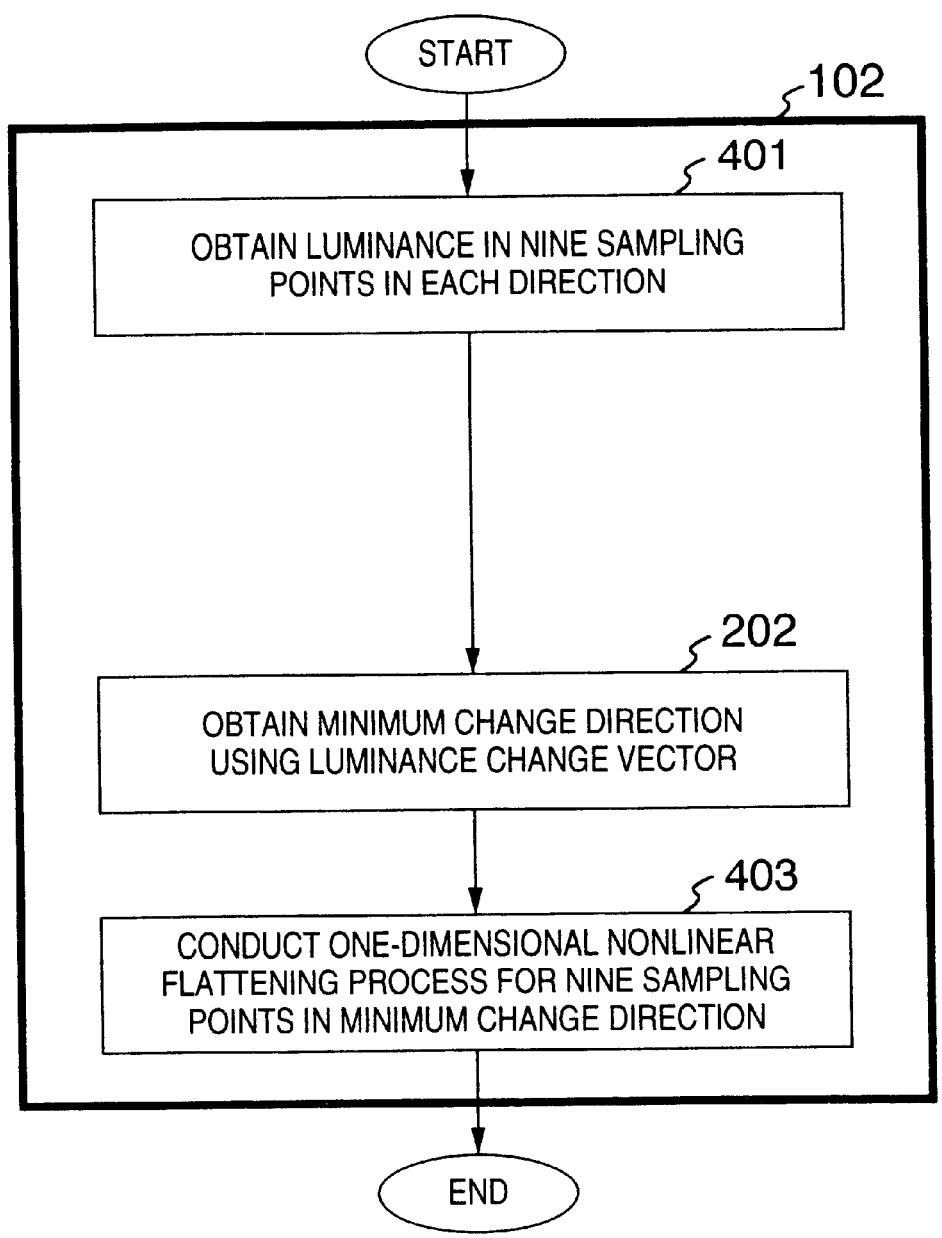
FIG. 4 is a flowchart showing in detail an example of a processing procedure of step 102 of FIG. 1.

FIG. 4 is a flowchart showing in detail an example of the processing procedure of Step 102.

Step 401: The luminance change vector is obtained in the same way as for step 201 of FIG. 2. However, luminance change values are calculated for nine points in each direction. For example, the range of m of expression (2) need only be specified as $-4\leq m\leq 4$.

Step 202: As in step 202 of FIG. 2, the minimum change direction is attained.

Step 403: As in step 203 of FIG. 2, a one-dimensional nonlinear flattening process is conducted in the minimum change direction. However, the operation is carried out for nine points. For example, when expressions (4) to (7) are used, it is only necessary that the range of m of expressions (5) and (7) is set as $-4\leq m\leq 4$ and the denominator of expression (5) is set to "9". Similarly, when expressions (8) to (11) are used, the range of m of expressions (8) and (10) is only required to be set as $-4\leq m\leq 4$.

Although the number of points is not limited to nine for the flattening, nine or eleven points are favorable in the flattening of the flat zone as a result of evaluation of head and abdomen images obtained by MRI ordinarily used for the clinical imaging process. The 9-point flattening results in acceptable images, whereas the 11-point flattening gives us an impression of excessive flattening.

Figure 5:
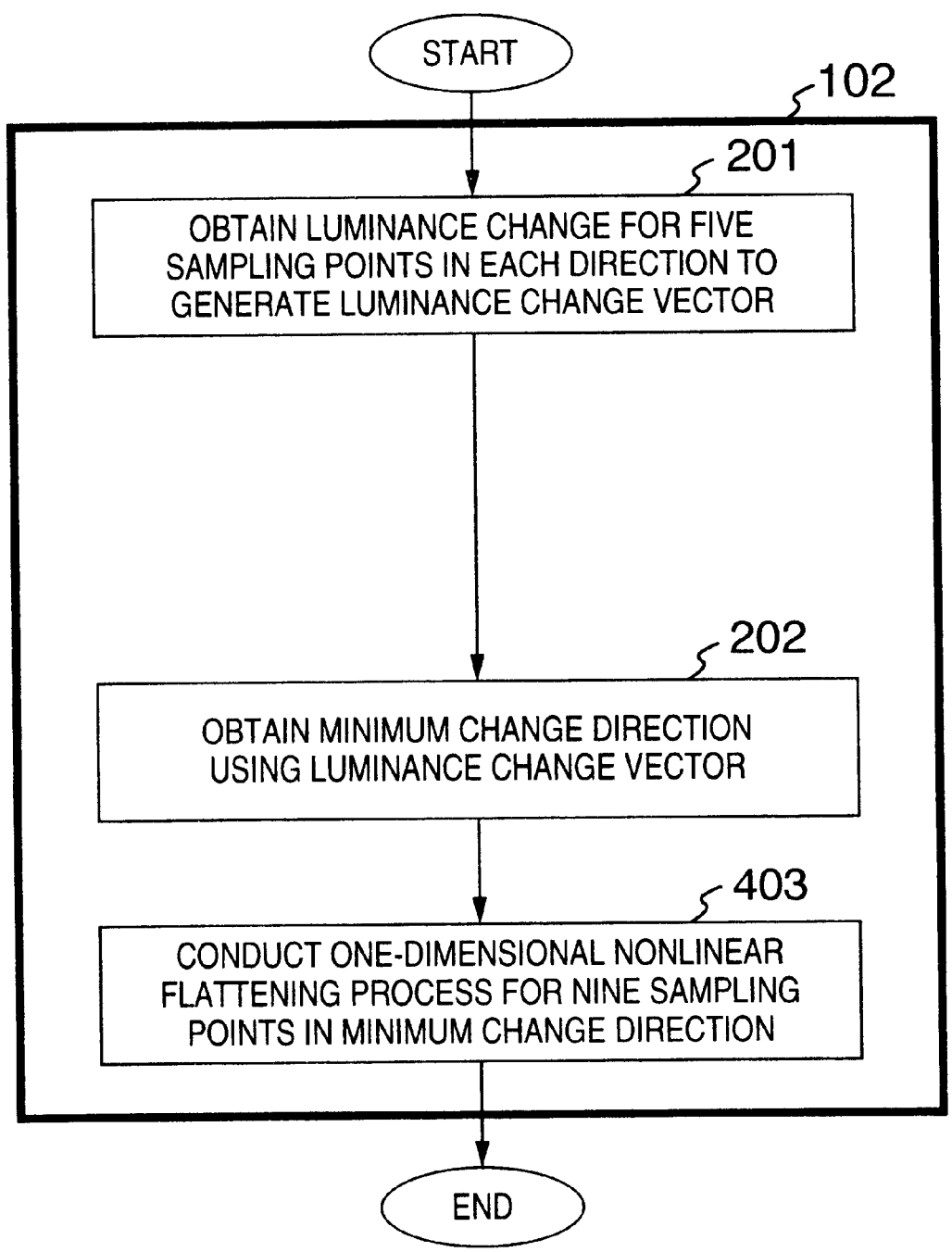
FIG. 5 is a flowchart showing in detail another example of the processing procedure of step 102 of FIG. 1.

FIG. 5 is a flowchart showing in detail another example of the processing procedure of step 102.

Step 201: The luminance change vector is obtained for five points in each direction as in step 201 of FIG. 2.

Step 202: The minimum change direction is obtained as in step 202 of FIG. 2.

Step 403: A one-dimensional nonlinear flattening process is conducted in the minimum change direction as in step 403 of FIG. 4.

Although the processing results of FIG. 5 are slightly inferior in picture quality to those of FIG. 4, the difference is not so great. On the other hand, when compared with the processing of FIG. 4, the processing of FIG. 5 is advantageous in that the processing speed can be increased for the following reasons. The processing of step 201 of FIG. 5 is equal to that of step 201 of FIG. 2 and hence the processing results of step 201 of FIG. 2 can be directly utilized; actually, it is not necessary to execute the operation.

In another example of the nonlinear flattening process effective for the flat zone, there may be employed a method in which a one-dimensional nonlinear flattening process is executed in the minimum change direction as well as in a direction 45° shifted from the minimum change direction to produce a mean value thereof as output data. In this method, the directionality is suppressed and the effect of flattening is much more increased.

Furthermore, in still another example, there may be adopted a method in which in accordance with data of peripheral points centered on a given point, an adaptive weighted averaging operation is conducted with variable weight for the respective data to produce a mean value thereof as output data.

(1-4) Processing Procedure of Step 103

(1) Edge image E is generated using an expression as follows.

$$E(i,j) = \sum_{p=-1}^{1} \sum_{q=-1}^{1} f(p,q) * I(i+p, j+q) \quad (14)$$

where, $E(i,j)$ is data of point of coordinates $(i,j)$ of edge image E. In addition, $I(i+p,j+q)$ indicates data of point of coordinates $(i+p,j+q)$ of the input image. Moreover, $f(p,q)$ is, for example, the value of expression (15) or (16) as follows.

If $p=q=0$, $f(0,0)=1$, if $p$ or $q$ is 0, $f(p,q)=-\frac{1}{4}$, otherwise, $f(p,q)=0$ \quad (15)

If $p=q=0$, $f(0,0)=1$, otherwise, $f(p,q)=-\frac{1}{8}$ \quad (16)

(2) Any point of which $E(i,j)$ exceeds a predetermined value is assumed to belong to the edge zone and hence map value $M(i,j)$ is set to "1". Any point of which $E(i,j)$ is less than the predetermined value is assumed to belong to the flat zone and hence map value $M(i,j)$ is set to "0".

The predetermined value as a threshold above need only be set, for example, as follows. Map values obtained for a given threshold are displayed. While interactively changing the threshold, the operator checks the map values to determine an appropriate threshold value. Additionally, the magnitude of noise in the input image may be evaluated to limit the threshold to a value obtained by multiplying a standard deviation of the noise by a predetermined value (e.g., three). Moreover, a cumulative histogram of edge image E may be generated to set the threshold to a value for which the histogram is equal to a predetermined ratio (e.g., 80%). In addition, the threshold may be set to the smaller one selected from the value obtained by multiplying a standard deviation of the noise by a predetermined value and the value for which the histogram is equal to a predetermined ratio.

In this connection, there may also be executed processing in which map value $M(i+p,j+q)$ is forcibly set to "1" for points in the vicinity of any point of which map value $M(i,j)$ obtained in article (2) is "1" to thereby increase the area of the edge zone. In this case, although the edge zone is less stable, there is obtained an advantage that the edge zone can be securedly recognized.

Next, description will be given of another processing procedure of step 103.

(0) Assume that step 101 of FIG. 1 has already been executed and minimum change direction dmin $(i,j)$ or blur minimum change direction dmin'$(i,j)$ has already been calculated.

(1) An orthogonal direction qd$(i,j)$ to minimum change direction dmin$(i,j)$ or blur minimum change direction dmin'$(i,j)$ is calculated. Orthogonal direction qd$(i,j)$ to blur minimum change direction dmin'$(i,j)$ is calculated as follows.

$$qd(i,j)=(dmin'(i,j)+4) \%8 \quad (17)$$

where, %8 is an integer operation to obtain a remainder by dividing a value by eight.

(2) Data is obtained, for example, at five points in orthogonal direction qd$(i,j)$ centered on a given point. In the data, a maximum value and a minimum value are determined to set difference therebetween as data of edge image E'. The operation is expressed as follows.

$$E'(i,j)=\max\{dirval\{i,j,qd(i,j), m\}|-2\leq m\leq 2\}-\min\{dirval\{i,j,qd(i,j), m\}|-2\leq m\leq 2\} \quad (18)$$

(3) Any point of which $E'(i,j)$ exceeds a predetermined value is assumed to belong to the edge zone and map value $M(i,j)$ is set to "1". Any point of which $E'(i,j)$ is less than the predetermined value is assumed to belong to the flat zone and hence map value $M(i,j)$ is set to "0".

As compared with the creation of map M from edge image E described above, the production of map M from edge image E' in this way leads to an advantage that the edge zone can be securedly recognized.

(1-5) Further Alternative Processing Procedures of Steps 103 and 104

Step 103: A degree map M" is generated in accordance with edge image E attained using expression (14).

$$M"(i,j)=E(i,j)*E(i,j)/(E(i,j)*E(i,j)+\gamma*\gamma*\sigma0*\sigma0) \quad (19)$$

where, γ is a predetermined parameter value to determine the degree for the edge and flat zones.

Step 104: Output image G is obtained through weighted averaging operation.

$$G(i,j)=M"(i,j)*A(i,j)+(I-M"(i,j)*B(i,j) \quad (20)$$

In accordance with the method above, assuming that he degree is "1" for the highest likelihood to an edge zone and the degree is "0" for the highest likelihood to a flat zone, there may be generated map M representing likelihood to the edge and flat zones with values between "1" and "0" to advantageously execute the flattening process in accordance with the degree.

In accordance with the first embodiment above, there is attained a flat image in which the edge is continuous and clear in the edge zone and the flattening effect is increased in the flat zone.

Second Embodiment

Figure 9:
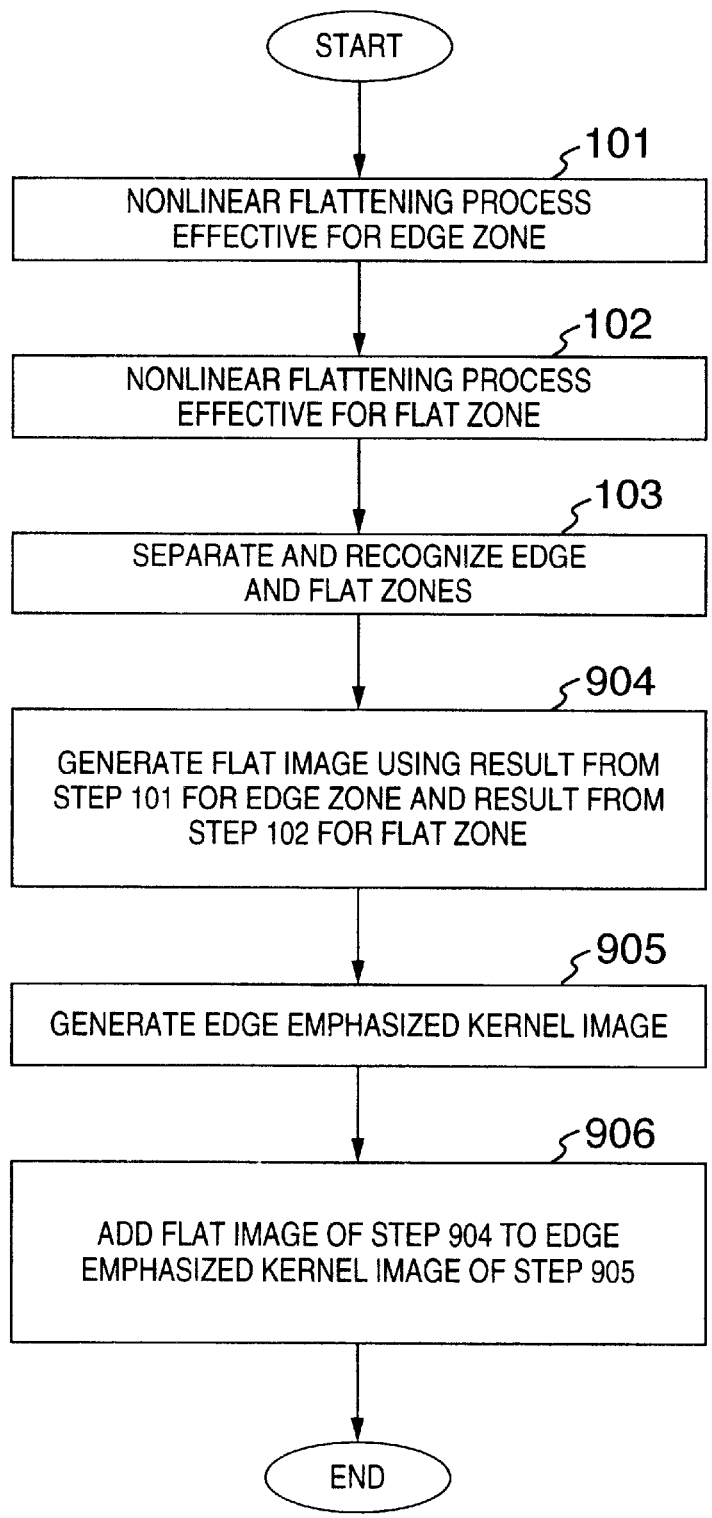
FIG. 9 is a flowchart showing an outline of a processing procedure of a second embodiment of an image processing method in accordance with the present invention.

FIG. 9 is a flowchart showing a processing procedure in accordance with the second embodiment.

Steps 101 to 103: Same as steps 101 to 103 of FIG. 1.

Step 904: Output image G of step 104 of FIG. 1 is assumed to be a flat image in this process.

Step 905: In accordance with an input image, an edge emphasized kernel image is generated. This processing will be described in detail later.

Step 906: The flat image and the edge emphasized kernel image are added to each other to obtain a final output image. In the operation, weight may be additionally used. In this regard, the input image and the edge emphasized kernel image may be added to each other to obtain a final output image.

Figure 10:
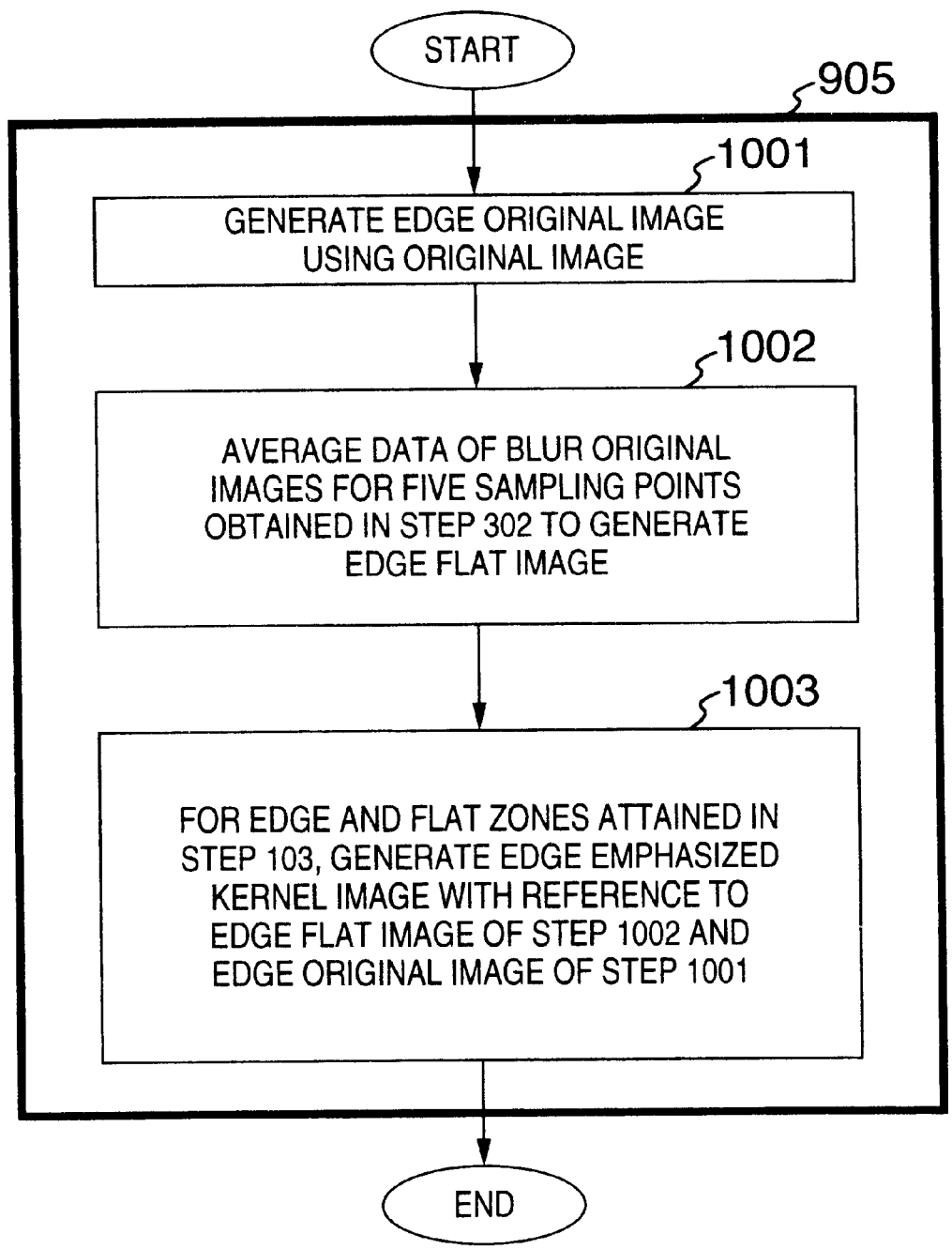
FIG. 10 is a flowchart showing in detail a processing procedure of step 905 of FIG. 9.

FIG. 10 is a flowchart showing a processing procedure of the edge emphasized image creating process of step 905.

Step 1001: An edge original image is produced using the input image. Edge image E represented by expression (14) may be directly used as the edge original image. In this case, the result of step 103 can be used to increase the processing speed. In the following description, it is assumed that edge image E of expression (14) is directly set as the edge original image and is expressed as edge original image E.

Step 1002: In accordance with edge original image E, a one-dimensional averaging process is conducted for five sampling points in the direction of blur minimum change direction dmin'(i,j) according to expression (13) to generate an edge flat image EH.

$$EH(i,j) = \sum_{m=-2}^{2} dirval\{E(i,j), dmin'(i,j), m\}/5 \quad (21)$$

Step 1003: An edge emphasized kernel image ET is created in accordance with values of map M obtained in step 103. For example, this operation is executed as follows.

If $M(i,j)=1$(edge zone), $ET(i,j)=EH(i,j)$,

If $M(i,j)=0$(flat zone), $ET(i,j)=k1*E(i,j)$ \quad (22)

where, k1 is a predetermined constant.

In this connection, when edge image E attained by inserting expression (16) in expression (14) is used as the edge original image, the value of parameter k1 of expression (22) is "⅓"; and when the weight for the edge emphasized kernel image in step 906 is in the range from about "½" to about "1", the output image seems to have a most naturally emphasized edge zone and hence picture quality of the output image is improved.

In accordance with the second embodiment above, there can be attained an output image in which the edge zone is continuously emphasized, and strongly undulated sections are emphasized in the flat zone, namely, the contour of the object is clearly emphasized.

In accordance with an image processing method and an image processing apparatus of the present invention, the edge zone and the flat zone are separated from the input image and the flattening process is appropriately conducted for each of the zones in accordance with its feature. Consequently, there can be obtained an output image having picture quality improved as compared with the prior technology.

Additionally, in accordance with a recording media on which an image processing program is recorded in accordance with the present invention, it is possible to make a computer to function as an image processing apparatus in accordance with the present invention.

What is claimed is:

1. An image processing method comprising:

recognizing an input image by separating an edge zone and a flat zone from the input image;

conducting a first nonlinear flattening process effective for the edge zone for data of the input image to obtain first data;

conducting a second nonlinear flattening process effective for the flat zone for data of the input image to obtain second data; and rearranging an image by using the first data for the edge zone and the second data for the flat zone, wherein the first nonlinear flattening process includes:

setting a plurality of directions about a given point of the input image;

calculating, for each of the plural directions, a change quantity in a data value of data at a point in the direction relative to a data value of data of the given point;

generating a data change vector including as elements thereof the change quantities in the plural directions;

setting at each of a plurality of points in the neighborhood of the given point a plurality of directions about the point;

calculating, for each of the plural directions, a change quantity in a data value of data at a point relative to a data value of data of the point in the neighborhood of the given point;

generating a data change vector including as elements thereof the change quantities in the plural directions about the point in the neighborhood of the given point;

adding the data change vector of the given point to the data change vector of the point in the neighborhood of the given point by assigning weight coefficients to each of the vectors and thereby generating a blur data change vector of the given point;

selecting a direction of an element having a minimum value from the elements of the blur data change vector; and conducting a one-dimensional nonlinear flattening process in accordance with data of a plurality of points in the direction of the minimum value element selected.

2. An image processing method according to claim 1, wherein the second nonlinear flattening process includes:

setting a plurality of directions about a given point of the input image;

calculating a change quantity in a data value of data at a point in each of the directions relative to a data value of data of the given point;

selecting one particular direction in accordance with the data change quantity; and conducting a one-dimensional nonlinear flattening process in accordance with data of a plurality of points existing in the direction selected, each of the points being farther apart from the given point as compared with the first nonlinear flattening process.

3. An image processing method according to claim 1, wherein the second nonlinear flattening process includes:

setting a plurality of directions about a given point of the input image;

calculating, for each of the plural directions, a change quantity in a data value of data at a point the direction relative to a data value of data of the given point;

selecting one particular direction in accordance with the data change quantity;

conducting a one-dimensional nonlinear flattening process in accordance with data of a plurality of points existing in the direction selected, each of the points being farther apart from the given point as compared with the first nonlinear flattening process;

conducting a one-dimensional nonlinear flattening process in accordance with data of a plurality of points existing in a direction shifted a predetermined angle from the direction selected, each of the points being farther apart from the given point as compared with the first nonlinear flattening process; and calculating a mean value of data obtained by the one-dimensional nonlinear flattening process in the direction selected and data obtained by the one-dimensional nonlinear flattening process in a direction shifted a predetermined angle from the direction selected.

4. An image processing method according to claim 1, wherein the second nonlinear flattening process includes conducting an adaptive weighted averaging operation of calculating a mean value of all data by assigning weight coefficients of mutually different values to respective data of the given point and peripheral points centered on the given point.

5. An image processing method according to claim 1, wherein the data includes data representing luminance of pixels of the original image.

6. An image processing method according to claim 1, wherein the edge zone and the flat zone of the input image are separated such that the first data is determined for a point corresponding to the edge zone by conducting the first nonlinear flattening process effective for the edge zone in accordance with data of the input image, and the second data is determined for a point corresponding to the flat zone by conducting the second nonlinear flattening process effective for the flat zone in accordance with data of the input image.

7. An image processing method, comprising the steps of:

a) calculating, for each of plural directions about a given point of an original image, a change quantity in a data value of data at a point the direction relative to a data value of data of the given point, and generating a data change vector including as elements thereof the change quantities in the plural directions;

b) calculating, for each of a plurality of points in the neighborhood of the given point, a change quantity in a data value of data at a point in the direction relative to a data value of data of the point in the neighborhood of the given point, and generating a data change vector including as elements thereof the change quantities in the plural directions about the point in the neighborhood of the given point;

c) adding the data change vector of the given point to the data change vector of the point in the neighborhood of the given point by assigning weight coefficients to each of the vectors and thereby generating a blur data change vector of the given point;

d) selecting a direction of an element having a minimum value from the elements of the blur data change vector;

e) conducting a nonlinear flattening process in accordance with data of a plurality of points in the direction of the minimum value element selected, and generating minimum blur change direction flat image data using data obtained by the nonlinear flattening process;

f) generating a map for discrimination of an edge zone and a flat zone of the image in accordance with the minimum blur change direction flat image data;

g) conducting a predetermined second nonlinear flattening process for data of the given point of the original image, and generating flat image data using data obtained by the second nonlinear flattening process; and h) rearranging an image with reference to the map by using the minimum blur change direction flat image data for the edge zone of the image and the flat image data obtained by the second nonlinear flattening process for the flat zone.

8. An image processing method according to claim 7, wherein said step e) includes the steps of:

e1) attaining a difference between a maximum value and a minimum value of data of the minimum blur change direction flat image data at a plurality of points in a direction orthogonal to the minimum blur change direction corresponding to the given point of the minimum blur change direction flat image data; and e2) determining the given point as the edge zone when the difference exceeds a predetermined value, and determining the given point as the flat zone when the difference is less than the predetermined value.

9. An image processing method in which an input image is recognized by separating an edge zone and a flat zone from the input image, a first nonlinear flattening process is executed on the edge zone of the input image in a predetermined direction, and a second nonlinear flattening process is executed on the flat zone of the input image, wherein the first nonlinear flattening process on the edge zone of the input image comprises:
calculating a brightness change value for each of plural directions at each point of the input image;
generating a brightness change vector having a component of the brightness change value;
generating a blur brightness change vector of a given point by averaging the brightness change vector of the given point and brightness change vectors of neighborhood points of the given point with predetermined weight coefficients;
determining a minimum blur change direction that is a direction of a minimum value in components of the blur brightness change vector; and
conducting a one-dimensional nonlinear flattening process in accordance with data of a plurality of points in the direction of the minimum blur change direction.

10. An image processing method according to claim 9, wherein the second nonlinear flattening process on the flat zone of the input image includes:
calculating a brightness change value for each of plural directions at a given point of the input image;
selecting a particular direction based on each of the brightness change values; and
conducting a one-dimensional nonlinear flattening process for a selected direction in accordance with data of points existing in the selected direction, each of said points being farther apart from the point that the first nonlinear flattening process on the edge zone is made.

11. An image processing method according to claim 9 or 10, wherein the second nonlinear flattening process on the flat zone of the input image includes:
calculating a brightness change value for each of plural directions at a given point of the input image;
selecting a particular direction based on each of the brightness change values; and
calculating a mean value of data obtained by one-dimensional nonlinear flattening process for a selected direction in accordance with data of points being farther apart from the point that the first nonlinear flattening process on the edge zone is made, and data obtained by one-dimensional nonlinear flattening process in a direction shifted a predetermined angle from the selected direction.

12. An image processing method according to claim 9, wherein the second nonlinear flattening process on the flat zone of the input image includes conducting an adaptive weighted averaging operation in accordance with data of peripheral points centered on the given point by applying a variable weight for the respective data to produce a mean value.

13. An image processing method comprising the steps of:
generating a brightness change vector having a component of a brightness change value by calculating the brightness change value for each of predetermined plural directions at each point of an input image;
generating a blur brightness change vector of a given point by averaging the brightness change vector of the given point and brightness change vectors of neighborhood points of the given point with predetermined weight coefficients;
determining a minimum blur change direction that is a direction of a minimum value in components of the blur brightness change vector; and
conducting a one-dimensional nonlinear flattening process in accordance with data of a plurality of points in the minimum blur change direction, and generating minimum blur change direction flat image data using data obtained by the one-dimensional nonlinear flattening process;
generating a map for discrimination of an edge zone and a flat zone of the input image in accordance with the minimum blur change direction flat image data; and
generating an output image with reference to the map by using the minimum blur change direction flat image data for an edge zone of the input image and by using data obtained by a predetermined nonlinear flattening process for a flat zone of the input image.

14. An image processing method according to claim 13, wherein said step of generating the map comprises:
calculating a difference between a maximum value and a minimum value in the minimum blur change direction flat image data of a plurality of points on a direction perpendicular to the minimum blur change direction corresponding to the given point in the minimum blur change direction flat image data; and
generating the map for discrimination of the edge zone and the flat zone of the input image in such a manner that when the difference is larger than a predetermined value, the given point is determined as the edge zone, and when the difference is smaller than the predetermined value, the given point is determined as the flat zone.

15. An image processing apparatus comprising:
means for recognizing an input image by separating an edge zone and a flat zone of the input image;
means for executing a first nonlinear flattening process on the edge zone of the input image;
means for executing a second nonlinear flattening process on the flat zone of the input image; and
means for generating an output image based on results of said means for executing the first nonlinear flattening process on the edge zone and said means for executing the second nonlinear flattening process on the flat zone,
wherein said means for executing the first nonlinear flattening process on the edge zone calculates a brightness change value for each of plural directions at each point of the input image; generates a brightness change vector having a component of the brightness change value; generates a blur brightness change vector of a given point by averaging the brightness change vector of the given point and brightness change vectors of neighborhood points of the given point with predetermined weight coefficients; determines a minimum blur change direction that is a direction of a minimum value in components of the blur brightness change vector; and conducts a one-dimensional nonlinear flattening process in accordance with data of a plurality of points in the minimum blur change direction.

16. A computer readable medium recording an image processing program executed by a computer for implementing an image processing method, said image processing method comprising:
recognizing an input image by separating an edge zone and a flat zone of the input image from each other;
executing a first nonlinear flattening process on an edge zone of the input image;
executing a second nonlinear flattening process on a flat zone of the input image; and
generating an output image based on results of executing the first nonlinear flattening process on the edge zone and of executing the second nonlinear flattening process on the flat zone, wherein the first nonlinear flattening process on the edge zone comprises the steps of:

calculating a brightness change value for each of plural directions at each point of the input image;

generating a brightness change vector having a component of the brightness change value;

generating a blur brightness change vector of a given point by averaging the brightness change vector of the given point and brightness change vectors of neighborhood points of the given point with predetermined weight coefficients;

determining a minimum blur change direction that is a direction of a minimum value in components of the blur brightness change vector; and conducting a one-dimensional nonlinear flattening process in accordance with data of a plurality of points in the minimum blur change direction.

* * * * *